Figure 1:
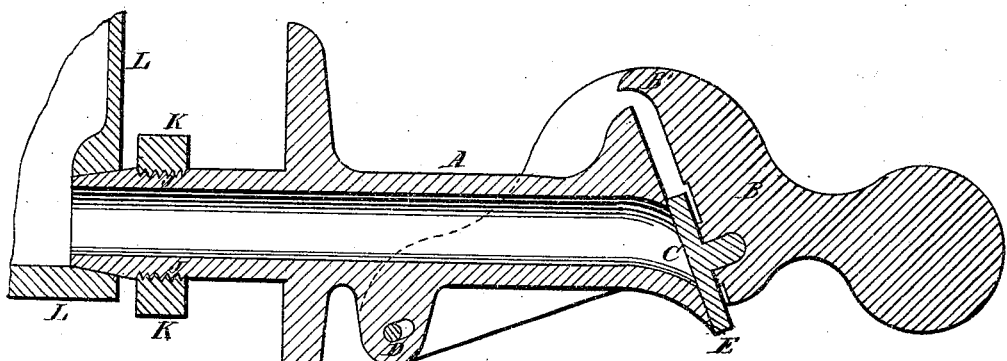

O. ZWIETUSCH.

Faucets.

No. 129,263.  Patented July 16, 1872.

Witnesses
J. B. Smith
F. E. Smith

Inventor
Otto Zwietusch

UNITED STATES PATENT OFFICE.

OTTO ZWIETUSCH, OF MILWAUKEE, WISCONSIN.

IMPROVEMENT IN FAUCETS.

Specification forming part of Letters Patent No. 129,263, dated July 16, 1872.

SPECIFICATION.

I, OTTO ZWIETUSCH, of Milwaukee, in the county of Milwaukee, in the State of Wisconsin, have invented certain Improvements in Glass Faucets, of which the following is a specification:

Nature and Object of the Invention.

My invention is a faucet for sirup and other purposes, made of glass, and therefore anti-corrosive, and is covered up with a cap, B', which prevents dirt from falling onto its mouth. The cap or mouth-piece is held in position over the outlet by the drop, which is hung to the faucet in rear of the opening, and the ball on the outer end is heavy enough to close the faucet when not held up; consequently the faucet is always closed, except when opened and held open. The inner end of the stock of one of the faucets is ground into a glass jar, and thus prevents any corrosion from any packing that might be used. These faucets are always clean and neat, and, being made of glass, much cheaper than any other faucet in use.

Description of the Drawing forming part of the Specification.

Figure 2:
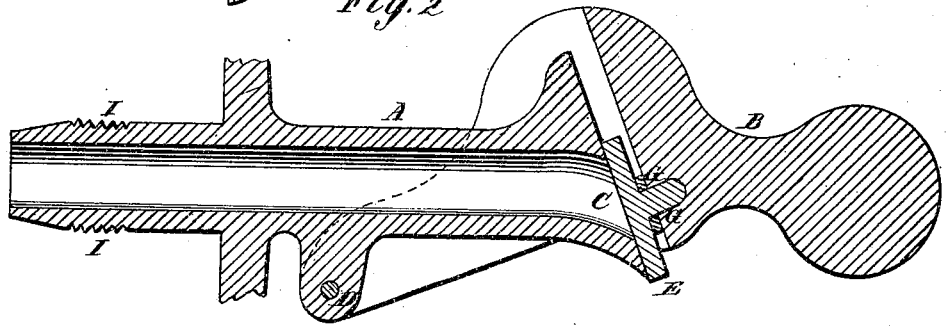

Figure 1, a view of a faucet with its end ground into a glass jar; Fig. 2, a faucet with a rubber holding the cap onto the outlet of the faucet.

General Description.

A is the body of the faucet; B, the drop; C, openings in the faucet through which the liquids flow; D, the pivot which holds drop in position in Fig. 1. The hole in the faucet in which the pivot D works is made oblong, so that as the drop is raised it will be pressed back and hold plate E against the opening. E, plate which covers the outlet of the faucet; G, rubber spring behind the plate E in Fig. 2; I, screw on the body of the faucet to screw it into the stand or into some elastic substance; K, an elastic nut for the faucet to screw into; L, glass jar. In the faucet, Figs. 1 and 2, the face or opening C at its upper end is on a circle with the lower end, measuring from the pivot D, so that the plate cannot pass over the upper point.

The operation of this faucet is very simple. Take hold of the drop B and raise it. This will slide the plate E up and leave the outlet open, and the sirup or other article will flow out. As soon as enough is discharged let go of the drop, and it will fall back in place and close the opening.

Claim.

I claim as my invention—

A faucet constructed as described, with the drop B, cap B', and yielding plate or valve E sliding against the inclined orifice c, substantially as described.

OTTO ZWIETUSCH.

Witnesses:
F. E. SMITH,
J. B. SMITH.